United States Patent
Stamm et al.

(10) Patent No.: US 11,112,604 B2
(45) Date of Patent: Sep. 7, 2021

(54) HEAD-UP DISPLAY

(71) Applicant: Continental Automotive GmbH, Hannover (DE)

(72) Inventors: Martin Stamm, Bad König (DE); Ulrich Kabatek, Babenhausen (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/828,737

(22) Filed: Mar. 24, 2020

(65) Prior Publication Data

US 2020/0326538 A1 Oct. 15, 2020

Related U.S. Application Data

(63) Continuation of application No. PCT/EP2018/073879, filed on Sep. 5, 2018.

(51) Int. Cl.
*G02B 27/01* (2006.01)

(52) U.S. Cl.
CPC .. *G02B 27/0101* (2013.01); *G02B 2027/0112* (2013.01); *G02B 2027/0138* (2013.01); *G02B 2027/0183* (2013.01)

(58) Field of Classification Search
CPC ............ G02B 27/0101; G02B 27/0093; G02B 27/01; G02B 2027/0112; G02B 2027/0138; G02B 2027/0183; G02B 2027/014; G02B 2027/0187
See application file for complete search history.

(56) References Cited

U.S. PATENT DOCUMENTS

| | | | | |
|---|---|---|---|---|
| 6,636,826 B1 * | 10/2003 | Abe | ...................... | G01C 21/165 |
| | | | | 702/151 |
| 2012/0314899 A1 * | 12/2012 | Cohen | ...................... | G06F 3/012 |
| | | | | 382/103 |
| 2014/0379260 A1 | 12/2014 | Maihoefer | | |
| 2015/0145761 A1 * | 5/2015 | Liao | ...................... | H04N 9/3194 |
| | | | | 345/156 |
| 2015/0338915 A1 * | 11/2015 | Publicover | ............ | G06F 3/0304 |
| | | | | 345/633 |
| 2017/0045736 A1 | 2/2017 | Fu | | |

FOREIGN PATENT DOCUMENTS

| | | | |
|---|---|---|---|
| DE | 202005021565 U1 | | 9/2008 |
| DE | 102009045169 A1 | | 3/2011 |
| DE | 102010003850 A1 | | 10/2011 |
| DE | 102012001951 A1 | | 8/2013 |
| DE | 102014006728 A1 | | 11/2015 |
| DE | 102016000412 A1 | | 7/2016 |
| DE | 202015104499 U1 | | 9/2016 |
| DE | 202015104499 U | * | 10/2016 |
| DE | 102015109027 A1 | | 12/2016 |
| DE | 102016009333 A1 | | 2/2017 |

* cited by examiner

Primary Examiner — Brent D Castiaux (57) ABSTRACT

A head-up display for a vehicle provides image warping. The head-up display comprises at least one sensor, an image generator, a display unit and a mirror unit. A correction unit is furthermore arranged following the image generator.

16 Claims, 6 Drawing Sheets

HEAD-UP DISPLAY

CROSS-REFERENCE TO RELATED APPLICATIONS

This U.S. patent application claims the benefit of PCT patent application No. PCT/EP2018/073879, filed Sep. 5, 2018, which claims the benefit of German patent application No. 10 2017 216 897.8, filed Sep. 25, 2017 and German patent application No. 10 2017 219 181.3, filed Oct. 26, 2017, all of which are hereby incorporated by reference.

TECHNICAL FIELD

A head-up display for a vehicle provides image warping.

BACKGROUND

Head-up displays aggregate information and make this accessible to the driver via an optical reflection at the windscreen.

Head-up displays enable readability for the driver with minimal distraction from traffic events. Until now, the resolution and position of the information in the head-up display was restricted to a small region of the driver's view. More recently, projection techniques that can cover a significantly larger area in the driver's field of view, and therefore permit a useful overlaying of virtually generated information onto the real image, have become available.

In this kind of virtual reality, also known as augmented reality, the requirements for minimum latencies in the image generation for the virtual information are extremely high, since the real image is perceived through the windscreen without latency. Compensation for the pitching movement of the vehicle is, inter alia, of importance for a high-quality optical impression of head-up displays with augmented reality. This entails a regulation with a high sampling time and the shortest possible dead times.

The prior art discloses a movable reflector through which movement in the position of the displayed virtual image is changed in order to avoid shifting a real image and a virtual image with respect to one another. In order to take the curvature of the mirror element, the windscreen, present at the changed position into account, a modification of the projected image signal appropriate for this changed position is performed. However, the movement of the mirror occurs with a certain latency, and the modification of the image signal requires a certain consumption of time and computing effort. Therefore, reaction to short-term changes that occur is only possible with a time delay. The real and virtual images are in these cases not consistent, which can lead to confusion of the user and thus to an impairment of driving safety. A head-up display that reduces the latency in comparison is thus desirable.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In a head-up display has at least one sensor, an image generator, a display unit and a correction unit of a mirror unit that follows the image generator. The correction unit may be arranged between the image generator and the display unit.

The correction unit serves to correct the position of the virtual image to be displayed, in particular in the event of suddenly occurring events such as bumps in the road or sudden braking and the forward pitching movement of the vehicle associated with that. The correction unit prevents the display of the augmented reality from shifting too far with respect to the real image. Lateral and combined shifts are also provided here. Allowing the head up display the ability to react quickly to short-term changes to the state of the vehicle. Such a change is, for example, a pitching movement as a result of a strong deceleration of the vehicle. A lateral movement resulting from a sudden change in the steering angle is also an example of such a change.

The fact that the correction to the position of the virtual image to be displayed brought about by the correction unit does not entail a modification of the projected image signal completely matching this changed position is accepted. Because of the somewhat different curvature of the windscreen, the mirror element, at this position, the shifted virtual image appears somewhat warped. This non-matching warping is acceptable for a short time, and generally strikes the user as less irritating than a shift between the real image and the virtual image.

The head-up display thus comprises a low-latency offset control. A gyroscope, an inwardly directed camera, an outwardly directed camera, radar, lidar or another suitable sensor is, for example, provided as the sensor. The image generator comprises electronics for generating the virtual image that is to be displayed. The current speed of the vehicle, navigation instructions, warnings or augmented reality are, for example, displayed there. Augmented reality refers to overlaying the real image with additional information.

The mirror unit is, generally, the windscreen of the vehicle, or an element, generally called a combiner, arranged between the windscreen and the driver or user. In general, one or a plurality of mirrors and/or one or a plurality of further optical elements, a lens for example, is or are arranged between the display unit and the mirror unit. One of these mirrors may be arranged movably in order to be able to generate a shift in the virtual image. One of these mirrors may comprise a curved surface with which an enlargement of the virtual image is achieved. It can also serve for an at least partial compensation of a curvature of the mirror unit, so that only a slight adjustment of a preliminary warping of the image to be displayed is required when the virtual image is shifted.

It is provided that the at least one sensor is a sensor with low latency. This has a quick detection of movements that are to be corrected, without having to wait for heavily delayed signals from sensors with greater latency.

It is provided that the at least one sensor is a gyroscope, also known as a gyro-sensor, and/or a steering angle sensor and/or a braking force sensor that is connected to an input of the correction unit. This has a quick detection of pitching movements or lateral movements of the vehicle caused, for example, by an abrupt braking maneuver, bumps in the road, or a fast change in the steering angle.

If the image generator comprises multiple elements with different latency times, it is provided that the correction unit follows the element with the highest latency time. Thus, the correction unit is not a separate element, but is integrated into the image generator. It may be arranged here in such a way that the signal that has been subjected to an offset does not experience an excessively large time delay in the following elements.

A high-pass filter may be present for the signal of the at least one sensor. Thus, only fast changes, for which the proper control is too slow because of the large number of computing operations that have to be carried out, are taken into account. Slow changes which occur, for example, in the presence of gentle braking or acceleration or during changes in the steering angle that are only small, are compensated through conventional means, for example by adjusting the adjustable mirror. The preliminary warping of the image to be displayed is here adjusted to the curvature of the windscreen corresponding to the respective position.

In a method for the operation of a head-up display, the image content to be displayed on the head-up display is first generated. This is subjected to pre-warping according to the optical boundary conditions of the head-up display. A display signal is generated from the pre-warped image signal. A fast change in the position of the intersection point of the direction of view of a user with a mirror unit of the head-up display is detected. An offset corresponding to this change in position is applied to the signal of the image content and/or the pre-warped image signal and/or the display signal. An offset is applied to the display signal, indirectly in the first two cases and directly in the last case. The display signal that is subject to the offset is displayed. Therefore, a fast reaction to short-term changes to the vehicle state, for example a pitching movement resulting from heavy braking or a lateral movement as a result of a change in the steering angle that occurs quickly. A change in the position of the intersection point of the direction of view of a user with the potentially curved surface of the mirror unit occurs in the case of a sudden pitching movement of the vehicle.

In the case of powerful braking, the intersection point moves upwards across the windscreen. In the case of a sudden change in the steering angle, lateral acceleration occurs wherein the intersection point is generally moved to the left or to the right because of the inertia of the head of the driver. A change in the position of the intersection point can thus be detected by detecting a pitching movement or a lateral movement.

Another possibility is that of evaluating the image of a camera directed at the driver for a change in the direction of view of the driver, or of evaluating the image of an outwardly directed camera for a vertical shift in the horizon. Using evaluation algorithms available nowadays, this takes place rather more slowly than the detection of a pitching movement or of a horizontal movement.

According to one development, a low-frequency component of the position change is used for preliminary warping of the image contents, while a higher frequency component is used to determine the offset. Thus, an additional sensor to be included in the preliminary warping is not necessary.

According to one development, the offset is reduced according to a time constant. The time constant depends here on the latency of the image generator. If a change in the position of the intersection point is lasting, the compensation then takes place by way of the more accurate calculation, without requiring a lasting offset.

It is provided that the fast change in position is detected by means of a gyro-sensor.

It is also possible to detect the fast change in position by means of an eye movement sensor. This is, for example, a camera directed at the driver with appropriate evaluation algorithms. In this case a horizontal offset and a combination of horizontal and vertical offsets can be detected, even if the change in position is not caused by a movement of the vehicle but by a change in the direction of view of the driver.

A further development consists in that the fast change in position is filtered by means of a signal originating from the eye movement sensor. A quick look in the rear-view mirror or the side mirror is, for example, filtered out here as an irrelevant change in position. A quick look at the car radio or at other operating elements, at passengers, or similar glances from which the user usually returns to the previous starting position, are also filtered out. Shifts by means of the offset that are unnecessary, because they cannot be observed, are thus avoided.

A computer program product comprises software code sections with which a method is carried out when the computer program product runs on a computer. Not only a currently typical digital computer, but also a quantum computer or other devices that in future replace the current digital computer are included here.

A non-volatile storage medium comprises software code sections with which the method is carried out when these software code sections are carried out on a computer.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
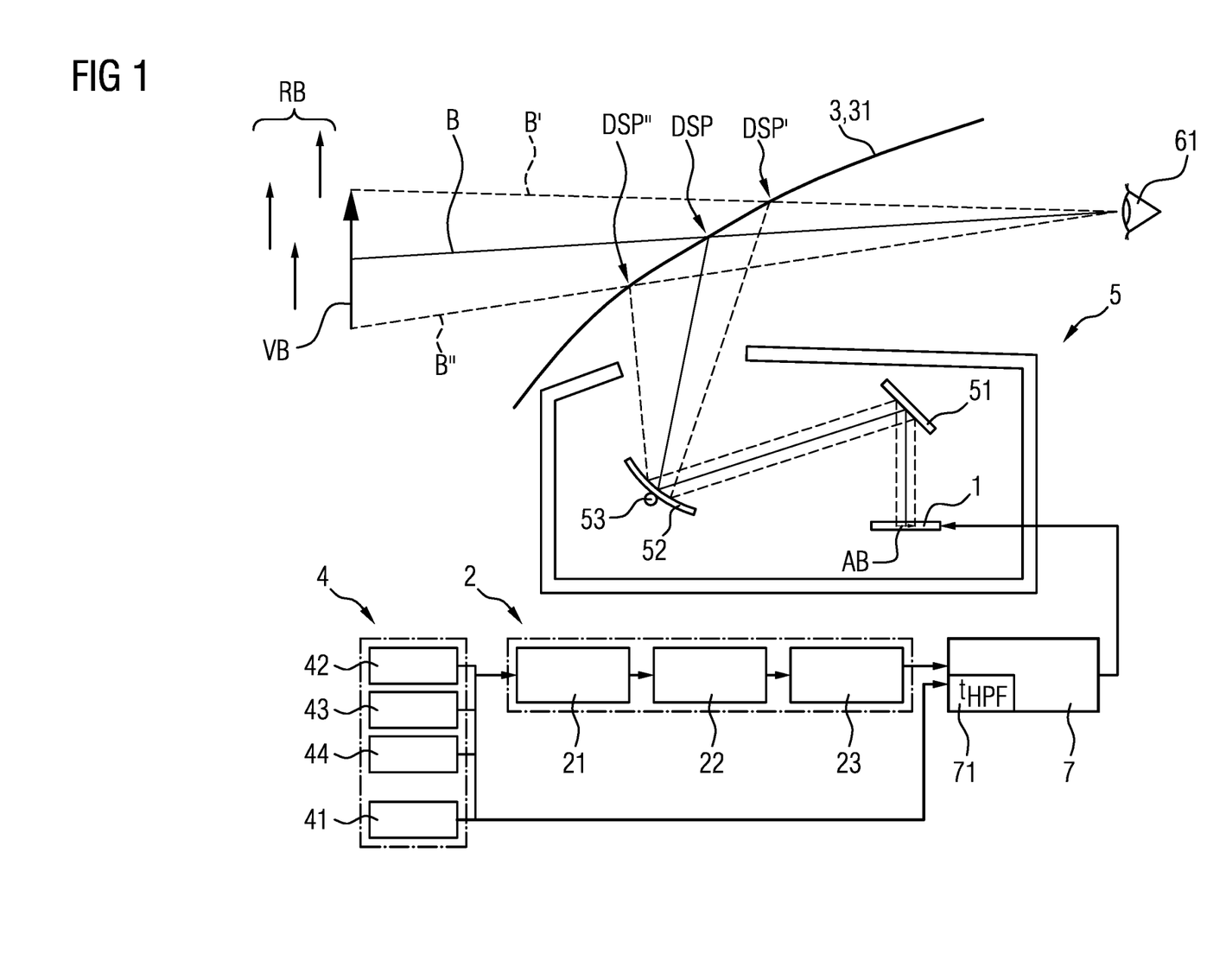
FIG. 1 shows a first head-up display.

FIG. 1 shows a head-up display. The eye 61 of an observer, for example the driver of a vehicle or another user, sees a virtual image VB through a mirror unit 3 which is here designed as the windscreen 31. The light beams falling into the eye 61 of the observer are reflected at the windscreen 31 which they reach from an optical unit 5. The virtual image VB appears to the eye 61 of the observer overlaid in reality, the real image RB. The real image RB is here illustrated symbolically through three arrows, arranged spatially staggered and at different heights.

A display unit 1, which is illustrated here as a self-illuminating flat display, for example an OLED display, is located in the optical unit 5. An image AB is indicated on the display unit 1. From there, light reaches a plane mirror 51 from which it is reflected onto a movable mirror 52. This reflects it in the direction of the windscreen 31, from whence it is reflected into the eye 61 of the observer. The movable mirror 52 is here shown to be rotatable about an axis of rotation 53. According to one variant, not illustrated, a rotation about an axis of rotation that is not parallel to the axis of rotation 53 is also provided.

An image generator 2 is connected at the input side to a sensor 4 and at the output side to a correction unit 7. A plurality of different types of sensor are illustrated in the sensor 4, of which at least one is present in the sensor 4. One of the sensors is a gyro-sensor 41, another is an inwardly or outwardly directed camera 42, another is a radar 43. Further sensors 44 are not shown here in detail. The output signals of the sensors 41-44 are supplied to the image generator 2.

The image generator 2 comprises a data processing unit 21 in which complex data processing takes place that is subject to a relatively high latency. This includes, inter alia, the image recognition in a real image of the surroundings recorded by a camera 42, in order to be able to assign appropriate additional data for the augmented reality to recognized image elements. The collection and preparation of further information to be displayed is also part of the data processing carried out by the data processing unit 21. The processed data are supplied to a drawing unit 22 that draws the image to be displayed. This is supplied to an image warper 23 that carries out a preliminary warping according to the curvature of the windscreen 31, as well as according to further optical boundary conditions causing a warp in the optical path between the display unit 1 and the eye 61. The pre-warped image signal is supplied to the correction unit 7. This has the output signal of the gyro-sensor 41 as a further input signal. If the signal of the gyro-sensor 41 indicates a pitching movement caused by braking, an offset is impressed onto the pre-warped image signal. This has the effect that the image to be displayed on the windscreen 31 moves further upwards, and the virtual image VB thus continues to fall into the eye 61 of the observer in accordance with the real image RB. A high-pass filter 71 is arranged in the correction unit 7, to which the signal of the gyro-sensor 41 is supplied. An offset is thus only generated when an abrupt change occurs. The time constant $t_{HPF}$ of the high-pass filter 71 is chosen accordingly.

If the image warper 23 has a low latency, then it is provided, in accordance with a variant not displayed here, that the correction unit 7 is arranged between the drawing unit 22 and the image warper 23. If the drawing unit 22 has a low latency, then it is provided, in accordance with a variant also not displayed here, that the correction unit 7 is arranged between the data processing unit 21 and the drawing unit 22. According to further variants, the correction unit 7 is integrated into the drawing unit 22 and/or the image warper 23. A further variant consists in that the correction unit 7 drives the display unit 1 and/or the movable mirror 52, in order to shift the image to be displayed on the windscreen 31 appropriately. A simultaneous correction at a plurality, or all, of the said locations, possibly to different degrees, also represents a variant according to the invention. If the further sensor 44 is a sensor of low latency, then according to variants this serves as an input signal of the correction unit 7 instead of or in addition to the gyro-sensor 41.

The direction of views B of the observer, also referred to as the user or driver, is drawn as the solid line between the eye 61 of the observer and the center of the virtual image VB. Their intersection with the sectional line of the windscreen 31 is the intersection point DSP. This is the point on the inner surface of the windscreen 31 at which the direction of view B, which can also be referred to as the sight line, intersects with this surface. If the observer changes his direction of view upwards, for example in accordance with the upper dotted line B', the intersection point DSP shifts upwards, here to the upper intersection point DSP'. If the observer changes his direction of view downwards, for example in accordance with the lower dotted line B", the intersection point DSP shifts downwards, here to the lower intersection point DSP". These changes to the direction of view can both be caused directly by the observer, for example by pivoting the view, or by the vehicle, for example when braking or steering.

Figure 2:
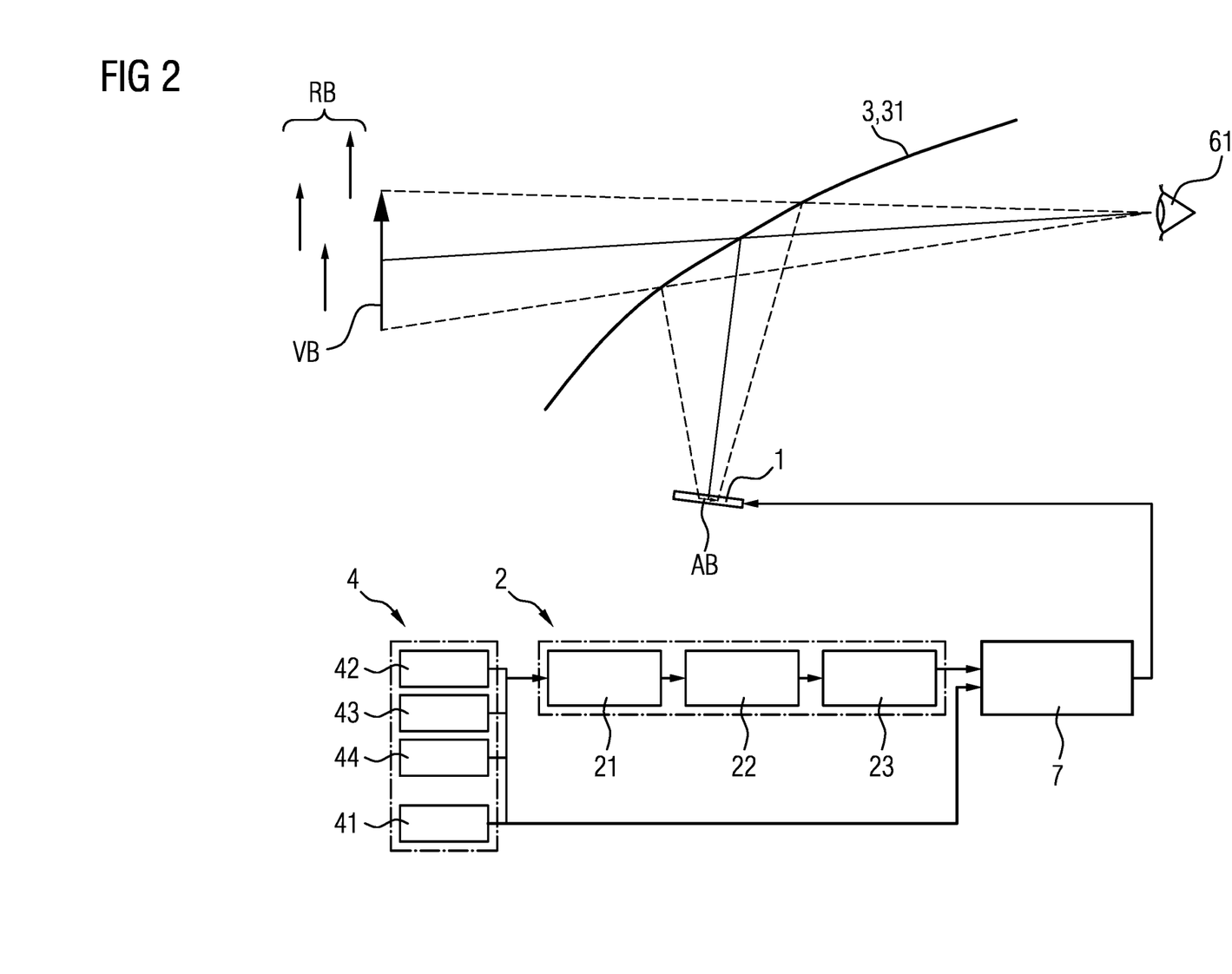
FIG. 2 shows a second variant of a head-up display.

FIG. 2 shows a variant of a head-up display. Elements that are the same as or that correspond to the previous illustration are given the same reference signs, and are only explained here to the extent that they differ in their embodiment or function from what was previously described, or that a renewed explanation appears useful for other reasons. This applies correspondingly to the description of the following illustrations.

The upper and lower parts of FIG. 2 corresponds to those of FIG. 1. Instead of the optical unit 5, a display unit 1 without a complex optical path is provided here. The display unit 1 is, for example, a tablet or smartphone with a sufficiently large screen diagonal, or another suitable display element that is reflected in the windscreen 31 and thus generates a virtual image VB for the eye 61 of the observer. The tablet or smartphone can, for example, be placed and held in place on the instrument panel cover. The output signal of the correction unit 7 is forwarded to the display unit 1 either over wires or wirelessly. Short-range radio connections such as WLAN or Bluetooth are suitable for wireless transfer. According to one variant, the correction unit 7 and the image generator 2, or parts of the image generator 2, are integrated into the display unit 1. This preferably takes place by means of a computer program product, for example what is known as an app, that comprises the corresponding software code sections.

A mixed realization of software code sections that carry out one part of the necessary functions and hardware elements that carry out another part is also possible here. In such a hybrid system, the graphic processor of a tablet or smartphone is, for example, used for specific graphic processing tasks, while other tasks are carried out by means of an app. The display of the tablet or smartphone then acts as an image generation unit of the display unit 1. The computer program product can be loaded over wires or wirelessly onto the tablet or smartphone, or supplied to the tablet or smartphone directly on a non-volatile storage medium, for example a semiconductor storage element, a memory card or a SIM card. A magnetic, optical or other storage medium that is supplied to the tablet or smartphone directly or via a reading device connected thereto, may also come into consideration as a non-volatile storage medium.

Figure 3:
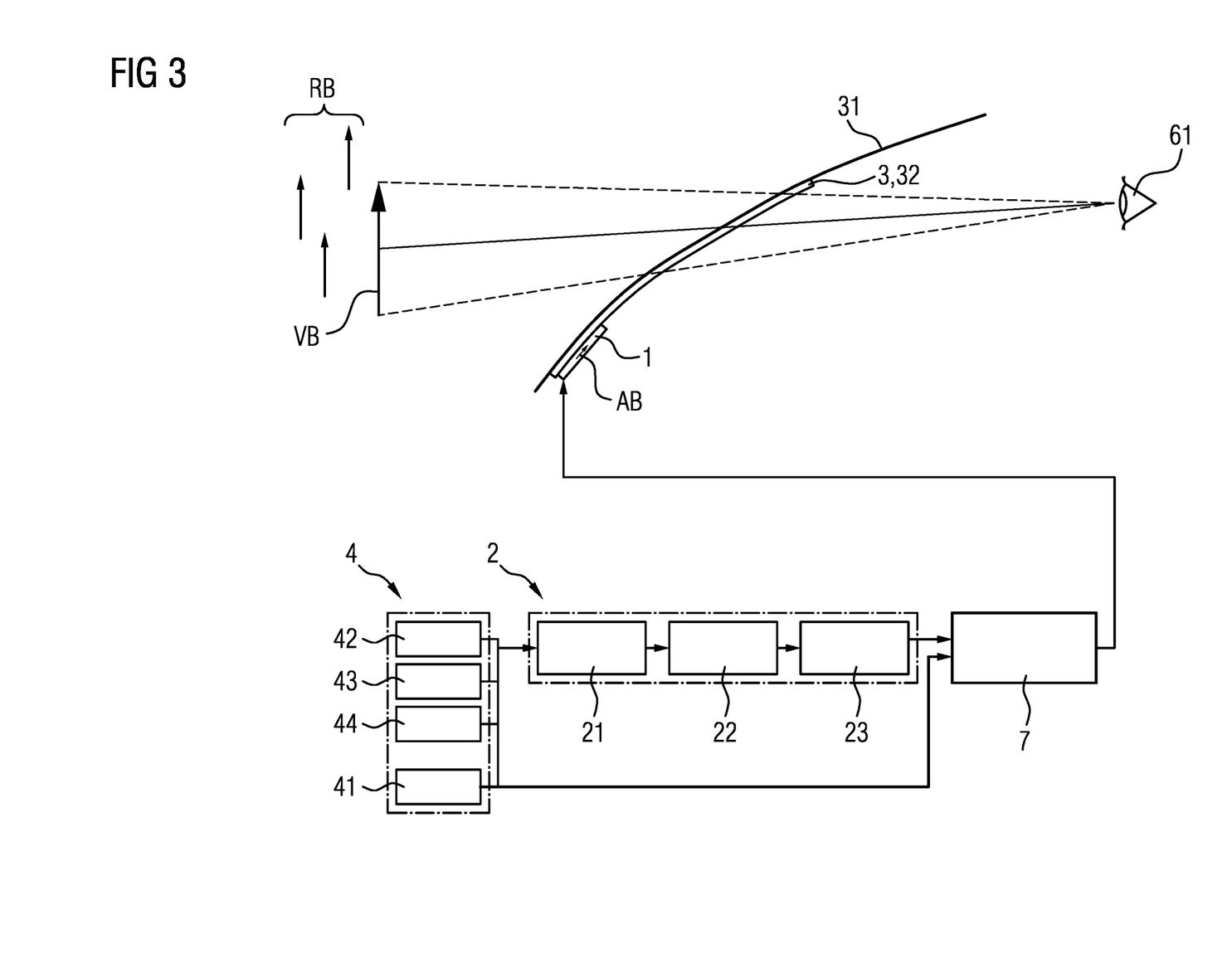
FIG. 3 shows a third variant of a head-up display.

FIG. 3 shows a further variant of a head-up display. Similarly to FIG. 2, an optical unit 5 is again here not provided. The mirror unit 3 is formed here by a light guide element 32. The light guide element 32 is, in the exemplary embodiment, attached directly to the windscreen 31. An alternative form of embodiment provides that the light guide elements 32 is arranged as a separate component between the windscreen 31 and the eye 61, close to the windscreen 32.

The display unit 1 is arranged in the lower region of the light guide element 32. The light guide element 32 is, for example, a holographic light guide, also known as "smart glass". In the part of the light guide element 32 that is adjacent to the display unit 1, holograms or grid structures are arranged which couple the light coming from the display unit 1 into the light guide. In the region adjacent thereto, holographic structures or grid structures may be arranged which contribute to an enlargement of the light propagating through the light guide element 32.

Further holographic structures or grid structures are located in the upper region of the light guide element 32, by means of which the light propagating in the light guide is coupled out and guided in the direction of the eye 61 of the observer. This outward coupling is comparable to a large number of semi-reflecting mirrors arranged one after another. The light guide element 32 thus performs the function of a mirror element 3. The structure of a corresponding light guide element 32 is known to one skilled in the art, and is therefore not described here any further.

Figure 4:
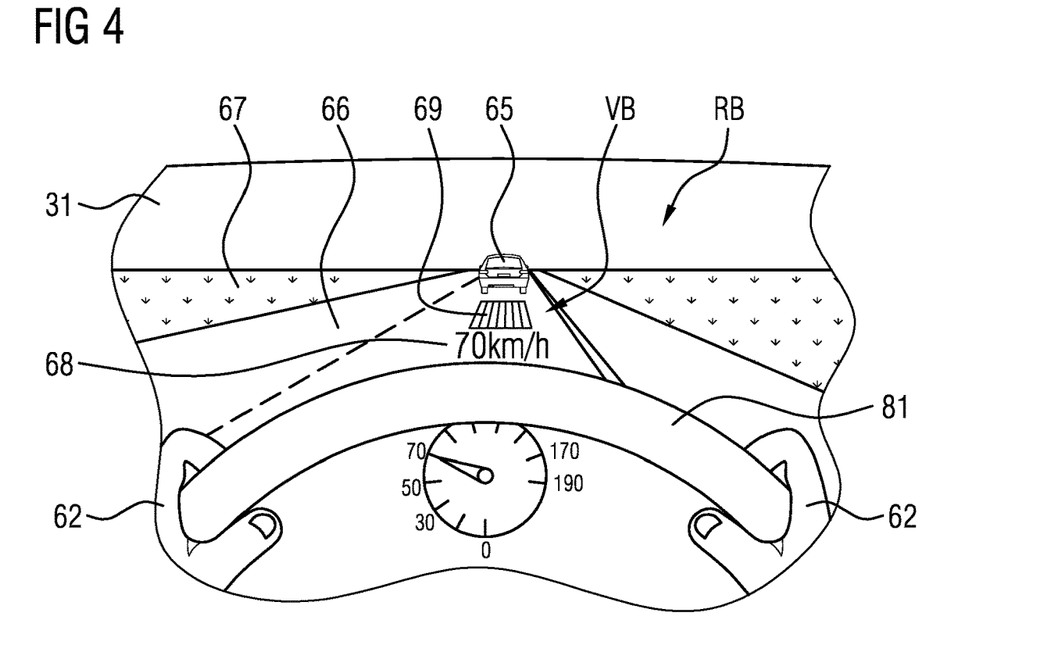
FIGS. 4-6 show the view as seen by the driver in different situations.
Figure 5:
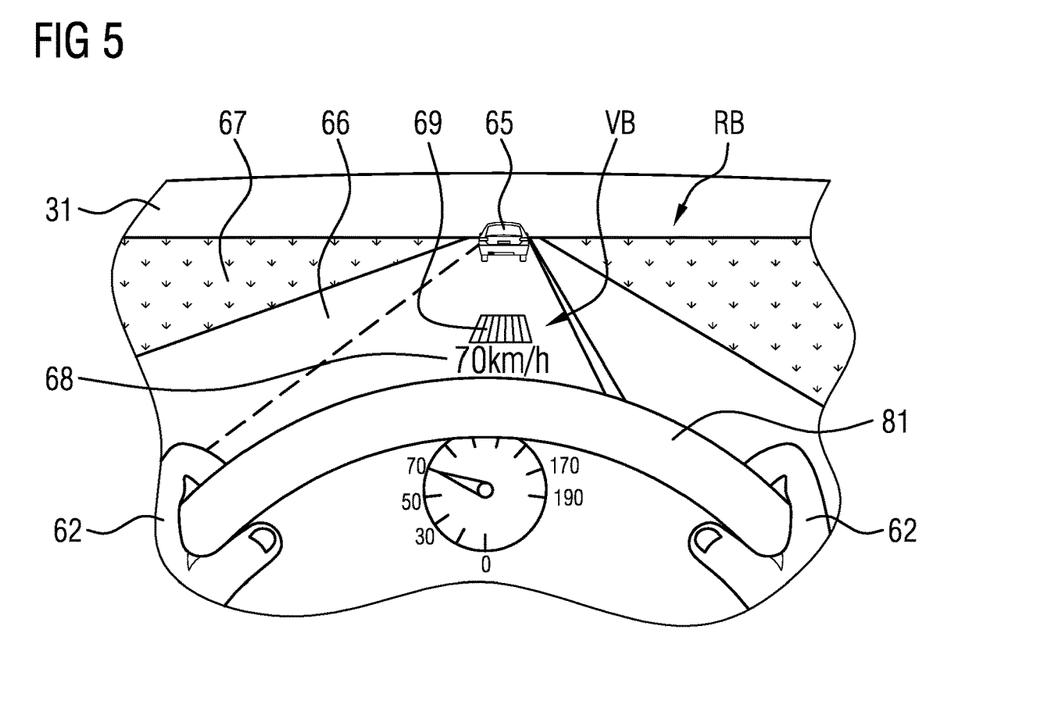
Figure 6:
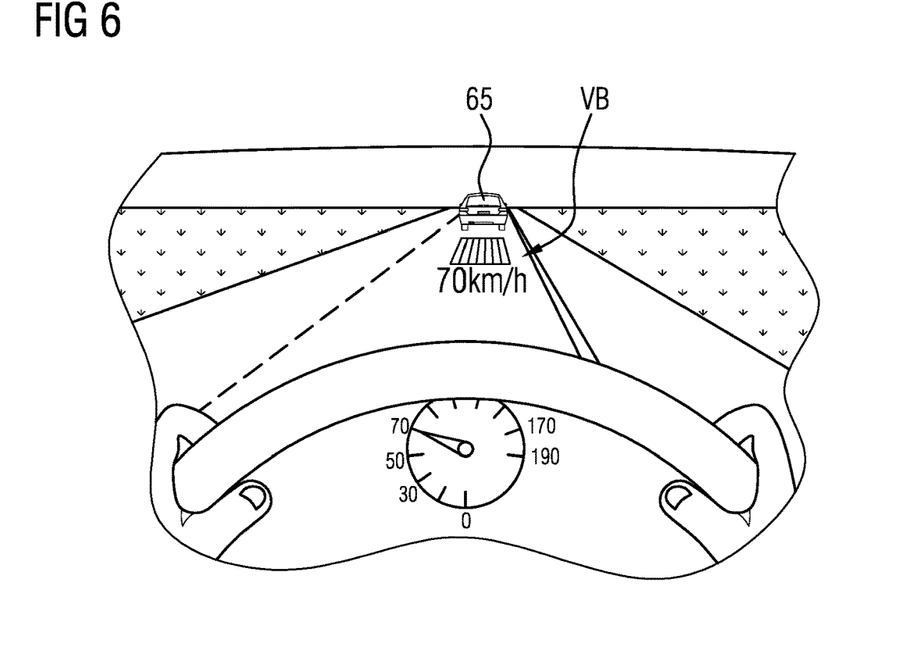

FIGS. 4-6 show a view through the windscreen 31 from the point of view of the driver in different situations. A steering wheel 81 that is held in the hands 62 of the driver can be recognized in FIG. 4. A speed indicator 82 can be recognized underneath the rim of the steering wheel. The real image RB, consisting of a preceding motor vehicle 65 in front, a road 66, and the landscape 67 can be recognized through the windscreen 31. A speed indicator 68 and a safe distance indicator 69 are displayed as a virtual image VB. The safe distance indicator 69 shows the driver what region behind the preceding motor vehicle 65 he should keep clear as a safe distance. The safe distance indicator 69 is an example of an additional item of information in the sense of augmented reality, which is arranged in a correct position behind the preceding motor vehicle 65. The safe distance indicator 69 is continuously adjusted by the data processing unit 21 and the drawing unit 22 to the changing position of the preceding motor vehicle 65 as time goes by. The longitudinal extent of the safe distance indicator 69 also changes as the speed of the vehicle changes.

FIG. 5 shows the same view as FIG. 4, with the difference that, due to a strong braking maneuver, a forward pitching movement has taken place, whereby the real image RB on the windscreen 31 has shifted upwards with respect to the virtual image VB. As a result of the complex data processing, the latency of the image generator 2 is of such a size that it takes a certain time until the direction of the pitching movement reverses and stable driving condition is finally again achieved.

The situation illustrated in FIG. 5 is confusing for the user, the driver of the motor vehicle, since the safe distance indicator 69 is no longer located at the correct position immediately behind the preceding motor vehicle 65, but is far too close to the user's own vehicle. This leads, in general, to confusing the driver, and the effect is also intensified in that the strong braking maneuver is usually also associated with an event that demands the attention of the driver.

According to one embodiment therefore, as shown in FIG. 6, the image AB to be displayed is given an offset, so that the virtual image VB again appears at the correct position behind the preceding motor vehicle 65.

Figure 7:
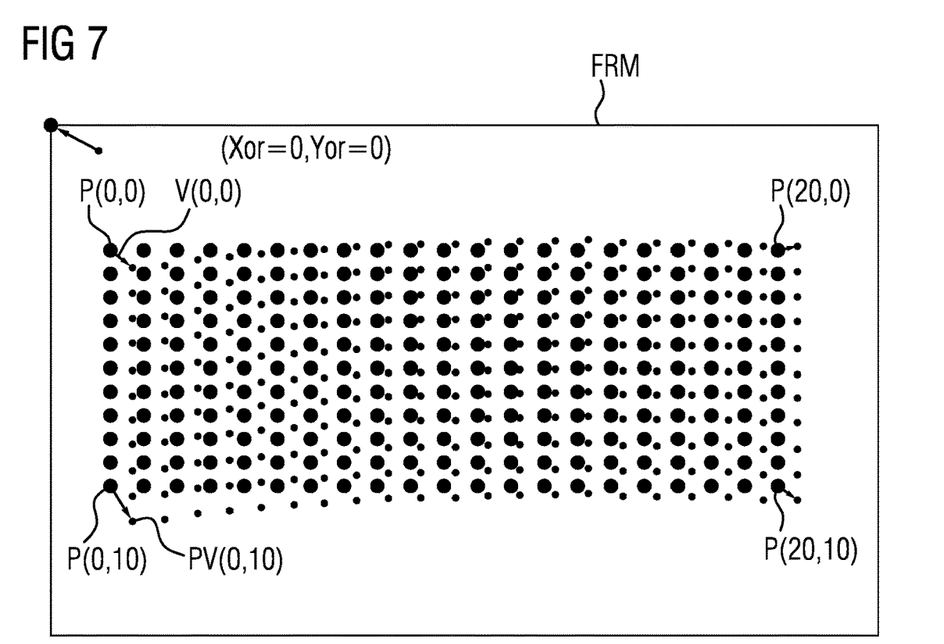
FIG. 7 shows an example of image warping.

FIG. 7 shows an example of an image warping. An image frame FRM, also referred to as a frame, whose origin (Xor=0, Yor=0) is located in the upper left-hand corner, is illustrated. The image dots P(n, m) with n=0, . . . , 20 and m=0, . . . , 10 that are to be displayed are arranged as large black dots on a regular grid. The image dots PV(n, m) that have been shifted following the warp by the image warper 23 are illustrated as small dots. They are calculated from the image dots P(n, m) by shifting along the vectors V(n, m). The vectors V(n, m) form a warping matrix.

It can be seen that the shift vectors V(n, m) have different directions and magnitudes. This is due to the fact that the mirror unit 3 has an inconsistent curvature that is compensated through the warp by means of the warping matrix. The pixels in the original image are then inside the rectangles with parallel axes, while the target pixels are located in what is called a quad (quadrilateral) that is determined by the respective warping matrix (or also the shift vectors), and whose mesh points are illustrated by the smaller dots.

Figure 8:
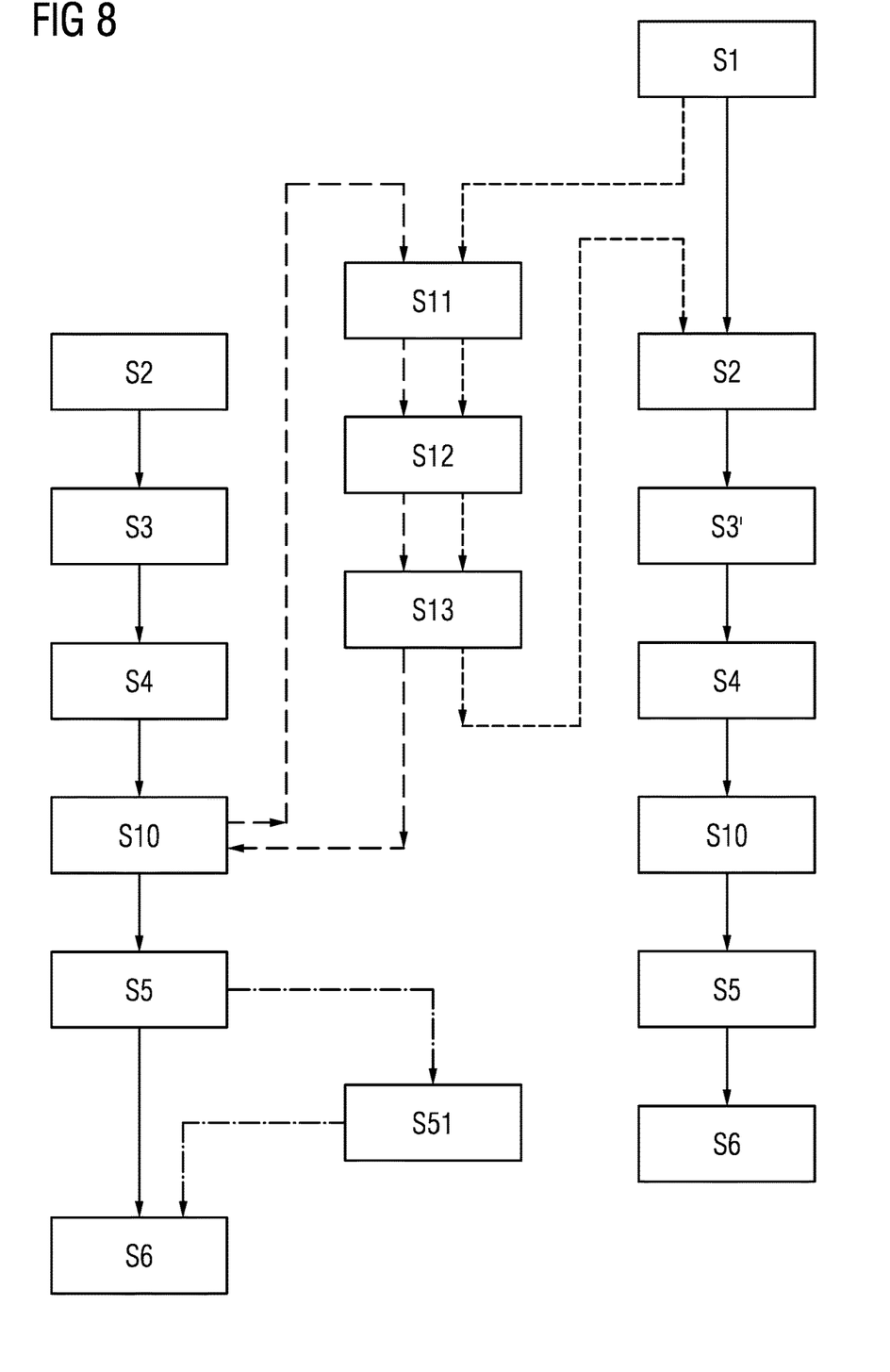
FIG. 8 shows a flowchart of one embodiment of a method.

FIG. 8 shows two main variants of a flowchart of a method. A first main variant is illustrated on the left-hand side by means of solid arrows. It comprises the following: generation S2 of the image content to be displayed on the head-up display. This, for example, takes place in the data processing unit 21 and/or the drawing unit 22 of the exemplary embodiments of FIGS. 1-3. Reference will continue to be made to these illustrations in what follows. Alternative variants in hardware, software or a combination of hardware and software also fall within the scope of the invention.

A pre-warping S3 of the image content corresponding to optical boundary conditions of the head-up display and the generation S4 of a display signal from the pre-warped image signal follow. This takes place, for example, in the image warper 23.

A detection S10 of a fast change in position of the intersection point DSP of the direction of view B of a user with a surface of a mirror unit of the head-up display then follows. This, for example, takes place through an interaction of the gyro-sensor 41 and the correction unit 7. Applying S5 an offset corresponding to the fast change in position that has been detected to the display signal takes place, for example, in the correction unit 7. A display S6 of the display signal to which the offset has been applied then takes place, for example on the display unit 1.

A second main variant of a method is illustrated on the right-hand side by means of solid arrows. It comprises the following: detection S1 of a change in position of the intersection point DSP of the direction of view of a user with a surface of a mirror unit 3, 31, 32 of the head-up display. This, for example, takes place through an interaction of the gyro-sensor 41 and the correction unit 7. The generation S2 of the image content to be displayed on the head-up display then follows. This, for example, takes place in the data processing unit 21 and/or the drawing unit 22.

A pre-warping S3' of the image content corresponding to optical boundary conditions of the head-up display and additionally corresponding to a low-frequency component of the position change follows. A display signal is generated S4 from the pre-warped image signal. The generation S4 and the pre-warping S3' take place, for example, in the image warper 23. Detection S10, application S5 and display S6 take place as in the main variant illustrated on the left.

According to further variants, which are illustrated with different dashes in the center, a detection S11 of the fast position change by means of a gyro-sensor 41 and/or a detection S12 of the fast position change by means of a signal of an eye movement sensor take place. The eye movement sensor is, for example, a camera 42 directed at the driver. If both detections S11, S12 are carried out, then, according to one variant, a filtering S13 of the fast position change by means of the signal of the eye movement sensor can then follow.

According to a further variant, a reduction S51 of the offset takes place in accordance with a time constant. Although this is only shown as a dot-dash line for the left-hand main variant, it can equally usefully be combined with the main variant illustrated on the right.

Accordingly, the processing is optimized in terms of the latency up to the image output. The facility of the video output for shifting the image that is to be output horizontally and/or vertically is used for this purpose. The optimized process chain then appears as follows: data processing with the determination of new image parameters takes place first. An offset for the video output in the x and/or y directions is then generated. The resulting image is then output at the video output. Since it is to be expected that the corrections required for the compensation of pitching movements are small in comparison with the total projection surface, the error caused by omitting the warping correction can be neglected. A few more further design options are given below, and further variants are also possible within the scope of the invention.

According to one variant, the whole of the correction logic, together with the sensors, for example the gyro-sensor 41, is integrated into a separate hardware component or into a more highly integrated system-on-chip.

According to another variant, the integration of the warping step takes place in the video output to improve the quality.

According to another variant, a shift in the output is provided by means of an adaptation of the display timing, the blanking interval. Here, however, a shift is only possible through an integral resolution.

Another variant consists in using a separate timing controller between the graphic processor and the display in some function paths for the drive of displays, wherein said timer is programmable and can also be used to implement an offset of the image output. Instead of computationally converting the display output, a shift of the output unit also takes place according to a further variant by means of a mechanical actuator, for example piezo elements.

According to a further variant, the measurement and determination of the offset takes place in a separate control unit. In this case, all the variants already referred to for portraying the offset can be employed unchanged.

The idea is based on a logical correction unit that can be physically implemented in different places. Accordingly, it is arranged as a separate correction unit 7, or integrated into the drawing unit 22, the image warper 23, the display unit 1 or a drive of the movable mirror 52. Other arrangements are also within the scope of the invention.

The correction takes place following the high-latency data processing unit 21, and signals of a partial quantity of the sensors 4, 41-44 are used as an input, in particular those that exhibit a low latency such as, for example, the gyro-sensor 41.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A head-up display comprising:
    an image generator which generates an image,
    at least one sensor capable of detecting a fast change in position in at least one of the image, a pre-warped image signal, and a display signal,
    a display unit, and
    a correction unit for a mirror unit, wherein the correction unit is arranged following the image generator, and wherein the correction unit applies an offset to the at least one of the image, the pre-warped image signal, and the display signal that corresponds to the fast change in position, and wherein the offset is reduced according to a time constant.

2. The head-up display as claimed in claim 1, wherein the sensor comprises at least one sensor with a low latency time which is connected to an input of the correction unit.

3. The head-up display as claimed in claim 1, wherein the at least one sensor is one of: a gyro-sensor, a steering angle sensor and a braking force sensor that is connected to an input of the correction unit.

4. The head-up display as claimed in claim 1, wherein the image generator comprises multiple elements with different latency times, and the correction unit follows the element with the highest latency time.

5. The head-up display as claimed in claim 1, wherein a high-pass filter is present for the signal of the at least one sensor.

6. A method for the operation of a head-up display, comprising:
    generating image content to be displayed on the head-up display;
    pre-warping the image content according to optical boundary conditions of the head-up display;
    generating a display signal from the pre-warped image signal;
    detecting a fast change in position of the intersection point of the direction of view of a user with a surface of a mirror unit of the head-up display;
    applying of an offset corresponding to the fast change in position that has been detected in at least one of the image content, the pre-warped image signal, and the display signal;
    reducing the offset according to a lime constant; and
    displaying the display signal to which the offset has been one of directly and indirectly applied.

7. The method as claimed in claim 6, further comprising:
    detecting a change in position of the intersection point of the direction of view of a user with a surface of a mirror unit of the head-up display;
    generating the image content to be displayed on the head-up display;
    pre-warping of the image content corresponding to optical boundary conditions of the head-up display and to a low-frequency component of the change in position;
    generating a display signal from the pre-warped image signal;
    detecting a fast change in position of the intersection point of the direction of view of a user with the mirror unit of the head-up display;
    applying an offset corresponding to the fast change in position that has been detected to one of the image content, the pre-warped image signal, and the display signal; and
    displaying the display signal to which the offset has been one of directly and indirectly applied.

8. The method as claimed in claim 6, further comprising detecting the fast change in position with a gyro-sensor.

9. The method as claimed in claim 6, further comprising detecting the fast change in position with a signal of an eye movement sensor.

10. The method as claimed in claim 9, further comprising filtering the fast change in position with the signal of the eye movement sensor.

11. A computer comprising software code sections with instructions for:
    generating image content to be displayed on a head-up display;
    pre-warping the image content according to optical boundary conditions of the head-up display;

generating a display signal from the pre-warped image signal;
detecting a fast change in position of the intersection point of the direction of view of a user with a surface of a mirror unit of the head-up display;
applying of an offset corresponding to the fast change in position that has been detected to at least one of the image content, the pre-warped image signal, and the display signal;
reducing the offset according to a time constant; and
displaying the display signal to which the offset has been one of directly and indirectly applied.

12. The computer as claimed in claim 11, further instructions comprising:
detecting a change in position of the intersection point of the direction of view of a user with a surface of a mirror unit of the head-up display;
generating the image content to be displayed on the head-up display;
pre-warping of the image content corresponding to optical boundary conditions of the head-up display and to a low-frequency component of the change in position;
generating a display signal from the pre-warped image signal;
detecting a fast change in position of the intersection point of the direction of view of a user with the mirror unit of the head-up display;
applying an offset corresponding to the fast change in position that has been detected to one of the image content, the pre-warped image signal, and the display signal; and
displaying the display signal to which the offset has been one of directly and indirectly applied.

13. The computer as claimed in claim 11, further instructions comprising detecting the fast change in position with a gyro-sensor.

14. The computer as claimed in claim 11, further instructions comprising detecting the fast change in position with a signal of an eye movement sensor.

15. The computer as claimed in claim 14, further instructions comprising filtering the fast change in position with the signal of the eye movement sensor.

16. The computer claimed in claim 11, further instructions comprising a non-volatile storage medium comprising the software code sections.

* * * * *